(12) United States Patent
Ghali et al.

(10) Patent No.: US 10,228,604 B1
(45) Date of Patent: Mar. 12, 2019

(54) DISPLAY STACK FOR BORDERLESS ELECTRONIC DISPLAYS

(71) Applicant: Amazon Technologies, Inc., Seattle, WA (US)

(72) Inventors: Hany Mounir Ghali, San Francisco, CA (US); Robert Arthur Sprague, Saratoga, CA (US); Siddharth Gupta, San Bruno, CA (US)

(73) Assignee: Amazon Technologies, Inc., Seattle, WA (US)

(*) Notice: Subject to any disclaimer, the term of this patent is extended or adjusted under 35 U.S.C. 154(b) by 231 days.

(21) Appl. No.: 14/851,731

(22) Filed: Sep. 11, 2015

(51) Int. Cl.
| | |
|---|---|
| G02B 26/00 | (2006.01) |
| G02B 26/08 | (2006.01) |
| G02F 1/29 | (2006.01) |
| G02F 1/167 | (2019.01) |
| G02F 1/1368 | (2006.01) |
| G02F 1/1345 | (2006.01) |
| G02F 1/1333 | (2006.01) |

(52) U.S. Cl.
CPC ............ *G02F 1/167* (2013.01); *G02F 1/1368* (2013.01); *G02F 1/13338* (2013.01); *G02F 1/13454* (2013.01)

(58) Field of Classification Search
USPC ........ 359/237, 242, 245, 250–254, 265–267, 359/270–273, 290–292, 295, 298, 359/315–318, 321, 322; 345/105–107
See application file for complete search history.

(56) References Cited

U.S. PATENT DOCUMENTS 9,568,800 B1 * 2/2017 Sprague .................. G02F 1/167

* cited by examiner

*Primary Examiner* — Brandi Thomas
(74) *Attorney, Agent, or Firm* — Eversheds Sutherland (US) LLP (57) ABSTRACT

Systems, methods, and computer-readable media are disclosed for borderless display stacks for use with electronic devices. In one embodiment, a display stack may include a thin film transistor (TFT) layer comprising an active area, an electrophoretic layer coupled to the TFT backplane, and an electrode coupled to a perimeter portion of the electrophoretic layer. The electrode may extend beyond peripheral edges of the electrophoretic layer. A portion of the electrode may be positioned between the electrophoretic layer and the TFT backplane, and the electrode may surround the active area. The display stack may include a cover layer coupled to the electrophoretic layer.

16 Claims, 7 Drawing Sheets

DISPLAY STACK FOR BORDERLESS ELECTRONIC DISPLAYS

BACKGROUND

Electronic devices may include displays to present information to users. Certain displays may have margins or borders around the displays that frame text or content for readability and may not present information to users. For example, a black or white border may surround an electronic display presenting text content. As a result, a display area for presenting information to users is reduced by borders or margins. Further, electronic device housing dimensions, such as a length and width of the electronic device, may be affected by an amount of display area desired, since the borders or margins may increase the electronic device dimensions.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for display stacks for borderless electronic displays. Display stacks, as described herein, may be used to form borderless electronic displays. Borderless electronic displays may result in efficient use of available display "real estate" and may facilitate increased functionality of displays by increasing an amount of area that can be used to present information to users. For example, rather than having a black border or margin surrounding an active display area, display stacks of the disclosure may extend active display areas to, or in some instances beyond (e.g., in curved display applications), outer edges of an electronic device housing. As a result, the active display area, or the area in which information or content may be presented to users, is increased, without increasing an overall size or dimensions of the electronic device that includes the display stack. Display stacks of the disclosure may therefore be used to present an increased amount of content or information to users via increased display area without increasing overall electronic device dimensions.

A variety of devices, such as electronic book ("eBook") reader devices, desktop computers, portable computers, smartphones, tablet computers, televisions, wearable devices, and so forth are used to access various forms of content and other information. Such devices may include displays that are used to present information or content to users. Example embodiments of the disclosure include display stacks for borderless electronic displays. Electronic devices that include display stacks of the disclosure may have increased display areas, and as a result, may present increased content and/or information to users, without increasing a size of the electronic device. In some example embodiments, the display stacks described herein may be flat and/or planar display stacks, while in other example embodiments, one or more components of the display stacks may be curved or partially curved. Embodiments of the disclosure may therefore increase display dimensions without increasing device size, and may not include margins or borders. Certain embodiments of the disclosure may be aesthetically pleasing to users by providing borders or margins that are separated from an active or driven portion of display stacks, resulting in full use of active or driven display areas.

Figure 1:
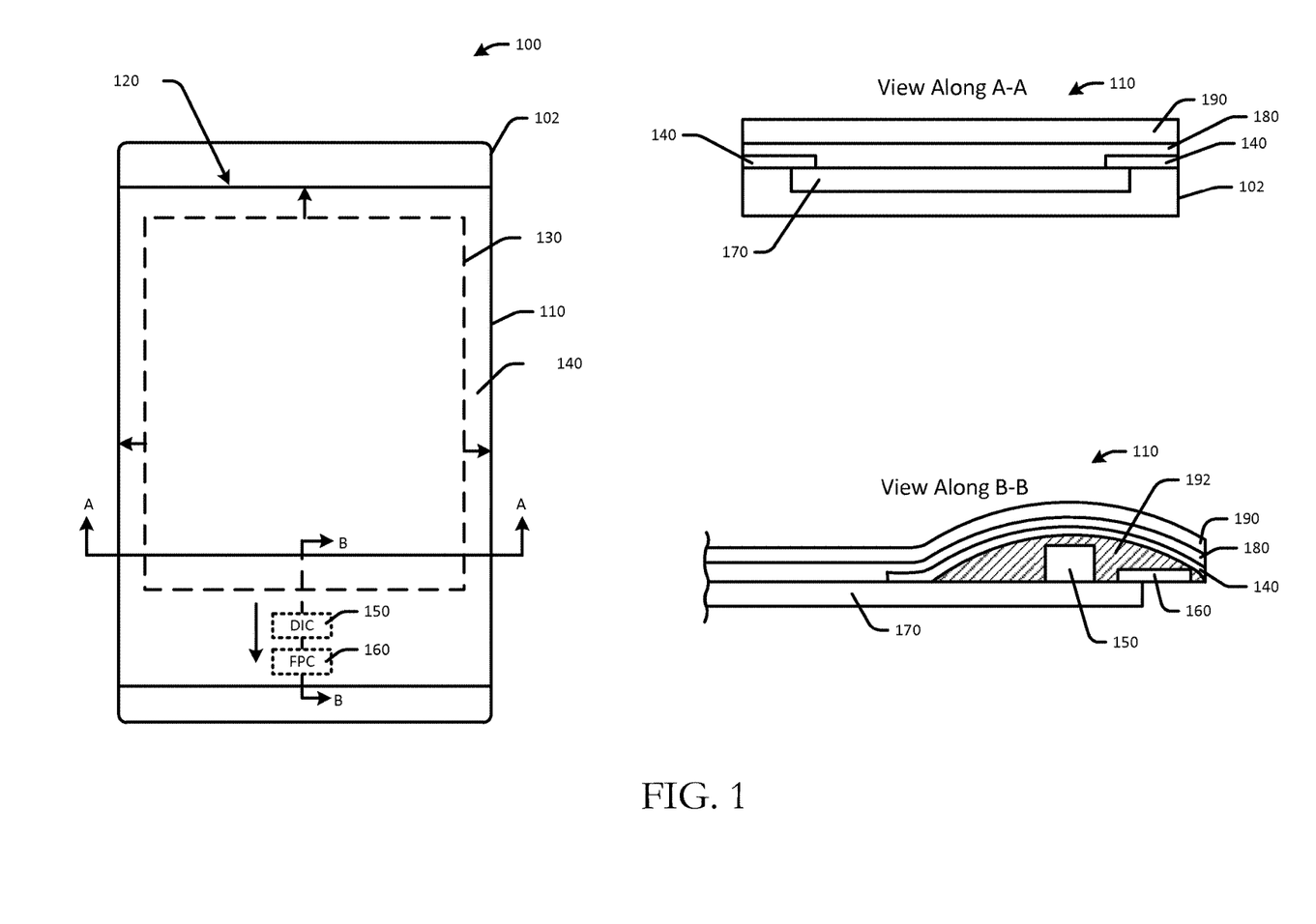
FIG. 1 is a schematic illustration of a top view and detailed cross-sectional views of an electronic device with a display stack in accordance with one or more embodiments of the disclosure.

Referring to FIG. 1, an example electronic device 100 with a display stack 110 is depicted in accordance with one or more embodiments of the disclosure. The electronic device 100 may include a housing 102 within which a portion of or the entire display stack 110 may be positioned. In some embodiments, the display stack 110 may form some or all of the device housing. The device 100 may comprise an electronic reader device ("e-reader"), a computer display, a portable computer, a smartphone, a tablet computer, a game console, a television, an in-vehicle display, and so forth. The display stack 110 may form a display of the electronic device 100 and may be configured to present information to and/or receive inputs from a user of the electronic device 100. In one example, the display stack 110 may form a touchscreen of the electronic device 100, where a user may touch or press a portion of the display stack 110 to make a selection or another input.

The electronic device 100 may include a display area 120. The display area 120 may be an area of the electronic device 100 that may be configured to be driven or controlled to present information or content. The display area 120 may include electronic margins or borders. As shown in FIG. 1, the display area 120 may extend to or beyond a perimeter, or outer edges, of a front face of the electronic device 100. In some embodiments, the display area 120 may curve around edges of the electronic device 100 to increase a size of the display area 120. Some or all of the display area 120 may be an active area 130. The active area 130 may be an active display area that is configured to dynamically present information. For example, the active area 130 may be a portion of the display area 120 that includes one or more pixels that can be driven. In some embodiments, the active area 130 may be defined, in part, by a thin-film-transistor (TFT) layer or TFT array substrate. For example, the active area 130 may be defined by the portion of a TFT backplane or TFT layer that includes one or more transistors, such as thin film transistors. In other embodiments, the active area 130 may be defined by a front plane laminate layer or ink layer. The active area 130 may be surrounded or partially surrounded by an electronic margin or border of the display area 120.

The display stack 110 may include a conductive layer 140 that surrounds or partially surrounds the active area 130 and increases a size of the display area 120. For example, the conductive layer 140 may include one or more portions positioned along one or more sides or edges of an electrophoretic layer. In some embodiments, the conductive layer 140 may form a margin, border, or selectable icons around the active area 130. For example, the conductive layer 140 may include a window portion that frames the active area of the TFT layer. The conductive layer 140 may be driven uniformly, or individual portions of the conductive layer 140 may be driven independently. In some embodiments, the conductive layer 140 may be in electrical communication with the active area 130 and/or a portion of a TFT layer. In other embodiments, the conductive layer 140 may be controlled or driven by another component of the electronic device 100. For example, the display stack 110 may be in electrical communication with a driver integrated circuit 150 and/or a flexible printed circuit 160. The driver integrated circuit 150 and/or the flexible printed circuit 160 may be configured to drive one or more components of the display stack 110. For example, the driver integrated circuit 150 and/or the flexible printed circuit 160 may be configured to drive a TFT layer of the display stack 110, which may control the active area 130. The driver integrated circuit 150 and/or the flexible printed circuit 160 may control the conductive layer 140.

Referring to the cross-sectional view of the electronic device 100 along line A-A, the display stack 110 may be positioned within the housing 102. The display stack 110 may have one or more layers, including, without limitation, a backplane substrate such as a TFT array substrate 170, the conductive layer 140, an electrophoretic layer 180, and a protective substrate 190. One or more adhesive layers may be interspersed between any or all pairs of adjacent layers in the display stack 110. The TFT array substrate 170 may be a rigid or flexible substrate. The TFT array substrate 170 may be made of any suitable rigid, semi-rigid, or flexible material, such as glass or a polymer plastic material.

The conductive layer 140 may be an electrode. The conductive layer 140 may be disposed in between the electrophoretic layer 180 and the TFT array substrate 170. In some embodiments, the conductive layer 140 may be positioned at a periphery of the electrophoretic layer 180 and/or the TFT array substrate 170. In some embodiments, the borderless display may be enabled by an electrode disposed at a periphery (in the margin) of the display to drive the margin region of the display to the edge of the device 100. The conductive layer 140 may be electrically coupled to the flexible printed circuit 160, the driver integrated circuit 150, a first active pixel of the TFT array substrate 170, or another pixel or electrical source. The conductive layer 140 may be patterned in some embodiments, for example, to form icons or other indicia.

The conductive layer 140 may be disposed on, or positioned adjacent to, the TFT array substrate 170. The conductive layer 140 may extend beyond an outer edge of the TFT array substrate 170 such that the conductive layer 140 overhangs the outer edge of the TFT array substrate 170. In this manner, the conductive layer 140 can be flexed over or around one or more edges of the electronic device 100. In some embodiments, the conductive layer 140 may be a thin conductive foil electrode, such as a metal (e.g., aluminum) foil electrode, an electrode comprising metal (e.g., copper) nanowires, or an electrode made from a non-metal conductive material, such as graphite, or a sputtered material. The conductive layer 140 may have a thickness that is no greater than about 30 microns (or micrometers (μm)), no greater than about 25 microns, no greater than about 20 microns, no greater than about 15 microns, no greater than about 12 microns, no greater than about 10 microns, no greater than about 8 microns, no greater than about 6 microns, or no greater than about 4 microns.

The electrophoretic layer 180 may be an ink layer. The electrophoretic layer 180 may be disposed on the conductive layer 140 and/or the TFT array substrate 170. The conductive layer 140 may be laminated to or adhered to the electrophoretic layer 180 about a periphery of the electrophoretic layer 180. The electrophoretic layer 180 may be flexible enough to bond to the surface of the TFT array substrate 170 notwithstanding the existence of the conductive layer 140 in between the TFT array substrate 170 and the electrophoretic layer 180. In some embodiments, a planarization layer may be interposed between the TFT array substrate 170 and the electrophoretic layer 180 to planarize the electrophoretic layer 180 where the electrophoretic layer 180 is not disposed on the conductive layer 140 (e.g., where the conductive layer 140 does not cover the TFT array substrate 170).

The electrophoretic layer 180 may include a dielectric solvent (e.g., a high dielectric, low viscosity suspending medium) and charged particles dispersed throughout the dielectric solvent. The charged particles may be of different colors (e.g., a combination of white, black, and/or colored particles). White particles and color particles, or white particles and black particles, may move within the dielectric solvent in response to an electric field applied thereto. For a mono type display stack 110, which generates black and white images on the display, the electrophoretic layer 180 may contain white and black particles. For a display stack 110 configured to generate colored images, the electrophoretic layer 180 may contain white and colored particles. In some embodiments, the electrophoretic layer 180 may have a thickness that is no greater than about 400 microns, no greater than about 350 microns, no greater than about 300 microns, no greater than about 300 microns, no greater than about 250 microns, no greater than about 200 microns, no greater than about 150 microns, no greater than about 120 microns, no greater than about 100 microns, no greater than about 80 microns, or no greater than about 60 microns.

The protective substrate 190 may form a cover layer and may be configured to protect the display stack 110. The protective substrate 190 may be a plastic, glass, film, or other suitable material and may be laminated to the electrophoretic layer 180 or another intervening component of the display stack 110. The protective substrate 190 may form an outermost layer of the display stack 110.

One or more of the conductive layer 140, TFT array substrate 170, electrophoretic layer 180, and/or protective substrate 190 may have the same or different dimensions, including length, width, or thickness. One or more layers may be laminated or may be optically coupled with an optically clear adhesive. For example, an adhesive may be applied to a surface of the conductive layer 140. The adhesive may be a conductive adhesive in order to provide an electrical coupling between the TFT array substrate 170 and the conductive layer 140 at the interface between them. The electrophoretic layer 180 may be flexible enough to bond the electrophoretic layer 180 to the TFT array substrate 170 notwithstanding the existence of the conductive layer 140 in between the TFT array substrate 170 and the electrophoretic layer 180 at the periphery of the electrophoretic layer 180. However, a planarization layer may be applied to the TFT array substrate 170 on the front surface where the conductive layer 140 does not cover the TFT array substrate 170 to planarize the electrophoretic layer 180 in the interior region 118 of the electrophoretic layer 180.

The display stack 110 may be a passive matrix drive type, an active matrix drive type, or a segmented-electrode direct drive type display. The TFT array substrate 170 may be configured to provide an electric field to influence the movement of charged particles within the electrophoretic layer 180, which, in turn, may cause an image to be formed on the display. That is, if an electrical signal is applied to an electrode on the surface of the TFT array substrate 170, an electric field may be generated between the TFT array substrate 170 and the electrophoretic layer 180 and/or between the conductive layer 140 and the electrophoretic layer 180. The generated electric field may cause charged particles (e.g., white, black, grey, and/or colored particles) to move within the electrophoretic layer 180 so that an image or other content can be generated on the display of the electronic device 100.

In embodiments with a passive matrix display, the TFT array substrate 170 may be patterned with a row electrode and a transparent conductive layer or the electrophoretic layer 180 may comprise a column electrode, or vice versa. In embodiments with an active matrix display, the TFT array substrate 170 may include one or more pixel electrode(s), and the electrophoretic layer 180 may include a uniform transparent electrode, such as a uniform layer of indium tin oxide (ITO). In a segmented-electrode display embodiment, segmented electrodes may be provided on a substrate, such as the TFT array substrate 170, and may each be driven independently with the desired voltage to give the desired optical state in a so-called "direct drive" scheme). In such embodiments, the electrophoretic layer 180 may include a uniform transparent electrode. The TFT array substrate 170 may be disposed on a substantially flat portion or platform of the housing 102. The TFT array substrate 170 may also include a set of patterned electrodes with each electrode connected to its own driver, such as a segmented display.

The conductive layer 140 and/or the electrophoretic layer 180 may overhang the TFT array substrate 170 at one or more outer edges of the TFT array substrate 170. The conductive layer 140 may be configured to drive the display stack 100 where the electrophoretic layer 180 extends beyond the TFT array substrate 170. Moreover, the portion of the conductive layer 140 and the electrophoretic layer 180 that overhangs the outer edge(s) of the TFT array substrate 170 may be at least partly curved or flexed over one or more edges of the housing 102 or components of the electronic device 100.

Referring to the cross-sectional view of the electronic device 100 along line B-B, the display stack 110 may be configured to extend the display area 120 over one or more components of the electronic device 100. For example, the display area 120 may be extended over the driver integrated circuit 150 and the flexible printed circuit 160 to increase the display area 120 that is viewable. The driver integrated circuit 150 may be positioned on a surface of the TFT array substrate 170. The portion of the surface may not be patterned and/or may not include transistors. The flexible printed circuit 160 may be positioned at least partially on the same surface of the TFT array substrate 170. However, the flexible printed circuit 160 may overhang or extend beyond an edge of the TFT array substrate 170, as shown in FIG. 1. The display stack 110 may be configured to cover the driver integrated circuit 150 and the flexible printed circuit 160, thereby extending the display area 120 over the driver integrated circuit 150 and the flexible printed circuit 160.

An insulating layer 192 may be positioned over, and in some embodiments adhered to, the driver integrated circuit 150 and the flexible printed circuit 160. The insulating layer 192 may be planarized and may be configured to electrically insulate components, such as the driver integrated circuit 150 and the flexible printed circuit 160. The insulating layer 192 may be formed of a resin or other suitable material. The conductive layer 140 may be adhered to or otherwise positioned about an outer surface of the insulating layer. The electrophoretic layer 180 may be positioned adjacent to the conductive layer 140, and the protective substrate 190 may extend across the electrophoretic layer 190. The portion of the conductive layer 140 that covers the driver integrated circuit 150 and the flexible printed circuit 160 may have dimensions that are different than the other sides or portions of the conductive layer 140. For example, the portion of the conductive layer 140 positioned over the insulating layer 192 may be longer or wider that a portion of the conductive layer 140 positioned along other edges of the active area 130. The conductive layer 140, electrophoretic layer 180, and protective substrate 190 may be curved over a "top" or outer surface of the insulating layer 192. The curved portion of the display stack 110 may not be detectable by a human eye.

During operation of the electronic device 100, the TFT layer 170 may be driven to induce voltage desired to drive the ink layer 180. By driving the border pixels, some or all of the conductive layer 140 may also be driven to the same voltage potential. As a result, the display area margin may be driven actively to the black, white, or gray levels, all the way to, or beyond, edges of the TFT layer 170. In some embodiments, the TFT array substrate 170 may drive an addressable region of the display (e.g., the electrophoretic material in the electrophoretic layer 180 may be addressed with the TFT array substrate 170) where main text or content may be displayed, which corresponds to a region of the display where the conductive layer 140 does not cover the TFT array substrate 170. In other words, the TFT array substrate 170 may be configured to drive pixel information up to the edge of the inner edge of the conductive layer 140. The conductive layer 140 may be configured to drive the display at a periphery or margin area of the display. In this manner, the periphery of the display, instead of being addressable at the pixel level, may be driven by the conductive layer 140 to form any suitable image, indicia, or color in the periphery of the display. For example, the conductive layer 140 may drive the periphery to exhibit a white background, a black background, a shade of grey, or a colored background. In some instances, the background in the periphery may be selected to match the background color of the interior region of the display such that there is no perceivable demarcation or boundary between the interior region and the periphery of the display. The thickness of the conductive layer 140 and its ability to drive the periphery may facilitate a borderless appearance on the display. In some embodiments, a dedicated pad on the front surface of the TFT array substrate 170 may drive the conductive layer 140 at the same time that the TFT array substrate 170 drives the pixel information in the addressable region.

Accordingly, the systems, methods, computer-readable media, techniques, and methodologies described herein include display stacks for borderless electronic displays. Certain embodiments of the disclosure may include drivable display margins which can be driven all the way to, or beyond, edges of an electronic device. The display stacks for borderless displays described herein may improve user experience with electronic devices by making textual content look more like paper, increasing usage of active display areas, increasing space allocated to present information, and may provide users with an experience that is similar to viewing a tangible, hardcopy book, magazine, newspaper, or the like. The display stacks for borderless displays may also increase the display area on the electronic device by 10-25%, allowing for more content of the same size (e.g., font size) to fit on a single page, when presented on the display of the electronic device.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings. The techniques are described below with reference to the following devices and processes. However, a number of other devices may also employ these techniques. While FIG. 1 illustrates one example display stack, multiple other forms of display stacks, devices, and architectures may be included in other embodiments.

ILLUSTRATIVE EMBODIMENTS AND PROCESSES

Figure 2:
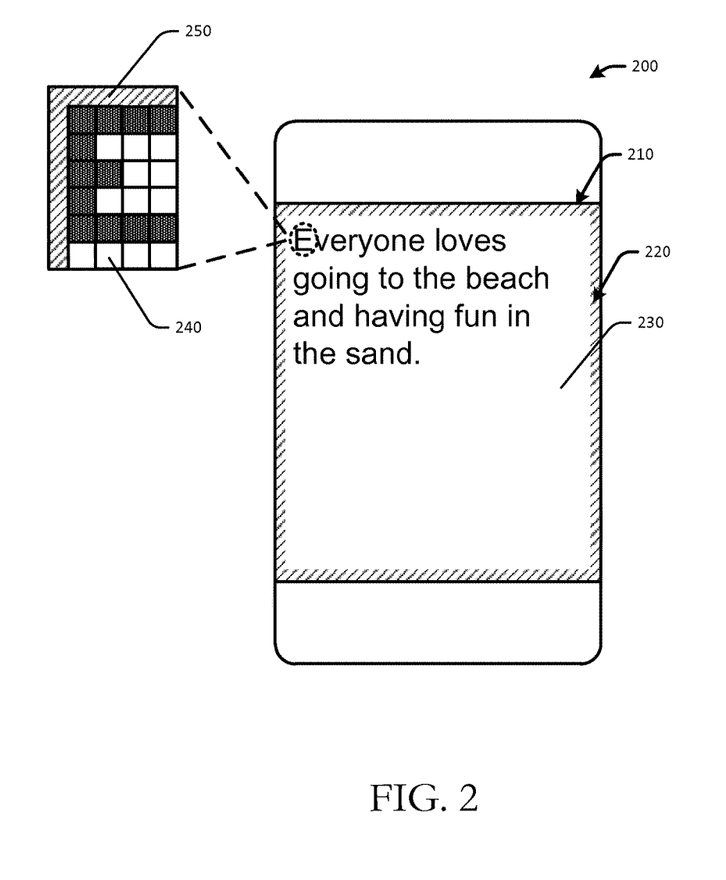
FIG. 2 is a schematic illustration of a top view of an electronic device with a display stack in accordance with one or more embodiments of the disclosure.
Figure 3:
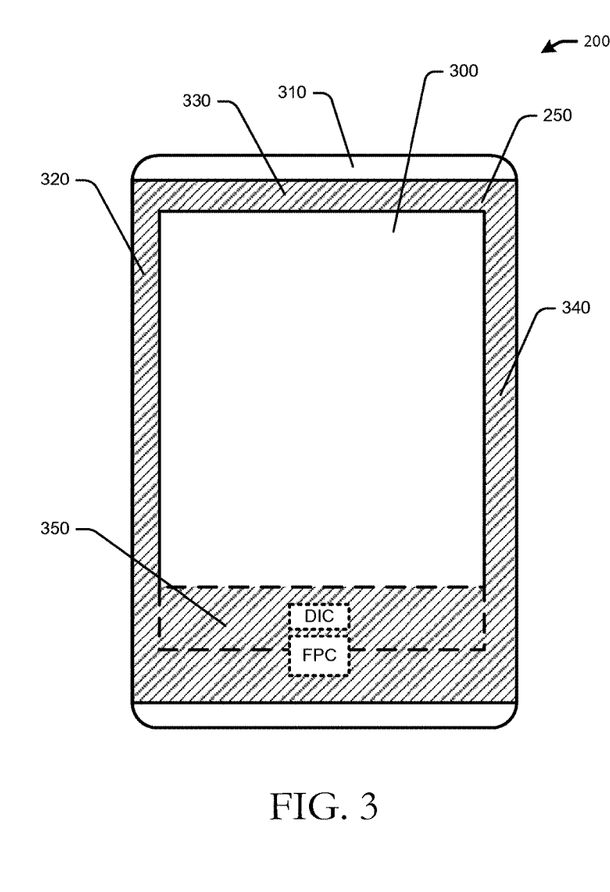
FIG. 3 is a partial schematic illustration of the display stack of FIG. 2 in accordance with one or more embodiments of the disclosure.

FIG. 2 illustrates an example embodiment of an electronic device 200 in front view in accordance with one or more embodiments of the disclosure. FIG. 3 depicts the electronic device 200 of FIG. 2 in a cross-sectional front view and will be described in conjunction with FIG. 2.

Referring first to FIG. 2, the electronic device 200 may include a display area 210. The display area 210 may be configured to present information and/or content. A margin 220 may be positioned about a perimeter of the display area 210. The margin 220 may be formed by one or more border pixels and/or transistor devices. An active area 230 may be enclosed or partially enclosed within the margin 220. The active area 230 may include a set of one or more first active pixels adjacent to the margin 220 or border pixels. The margin 220 may provide a border to facilitate consumption of content presented on the display area 210.

The margin 220 may be formed by one or more capacitive layers or portions. In some embodiments, the margin 220 may be driven to the same color and/or shading, while in other embodiments, different portions of the margin 220 may be driven to different colors or shadings. By using the capacitive layer to form the margin 220, an area of usage of the display may be increased. For example, the electronic device 200 may include a TFT layer. The TFT layer may include a TFT active area 240, as shown in FIG. 2. The TFT active area 240 may be formed of one or more transistors and/or may be in communication with one or more pixels. An electrode 250 may form the capacitive layer and may be positioned about the TFT active area 240. Because the electrode 250 may form the border or margin 220, an increased amount (in some instances all) of the TFT active area 240 may be used to present content rather than to form a border or margin. For example, in the illustration of FIG. 2, the electrode 250 may be in electrical communication with a first active pixel, or an outermost active periphery of the TFT active area 240, and the remaining TFT active area 240 may be used to present content or information. The electrode 250 may be driven to the same color as the first active pixel. In FIG. 2, text may be formed at an outer edge of the TFT active area 240, while the margin is formed by the electrode 250.

Referring to FIG. 3, the electronic device 200 is illustrated in a cross-sectional front view in accordance with one or more embodiments of the disclosure. The electronic device 200 may include a TFT layer 300. The electrode 250 may be positioned about a periphery or about outer edges of the active area of the TFT layer 300. The TFT layer 300 and the electrode 250 may be positioned within a housing 310 of the electronic device 200. The electrode 250 may form a first side margin 320 on a first side of the TFT layer 300, a second side margin 330 on an adjacent side of the TFT layer 300, a third side margin 340 opposite the first side margin 320, and a fourth side margin 350 opposite the second side margin 330. One or more of the side margins may have the same or different dimensions. For example, the first side margin 320, second side margin 330, and third side margin 340 may each have similar or the same dimensions, while the fourth side margin 350 may be larger than the other side margins so as to cover the circuitry mounted to the TFT layer 300. In other embodiments, other side margins may be longer or wider than the fourth side margin 350. One or more of the side margins may extend to outer edges of the device housing.

The TFT layer 300 may be created, in one embodiment, by depositing transistors and traces on a glass substrate using a through wire routing method. The TFT layer 300 may include an active area that is configured to be driven. The TFT layer 300 may be a rigid TFT layer or a flexible TFT layer. The active area may be surrounded or partially surrounded by a border or margin. The border or margin may have a first width and may extend about a periphery or perimeter of the active area.

The electrode 250 may include a conductive foil or layer that may be laminated about the perimeter of the TFT active area. The electrode may be in electrical communication with one or more components of the TFT layer 300. In the illustration of FIG. 3, the electrode 250 may include the first side margin 320 with a first width, the second side margin 330 with a second width, the third side margin 340 with a third width, and the fourth side margin 350 with a fourth width. The fourth width may be greater than the first width, the second width, and the third width. The electrode 250 may be die cut to a desired size and may be the same size or larger than the TFT layer size.

Figure 4:
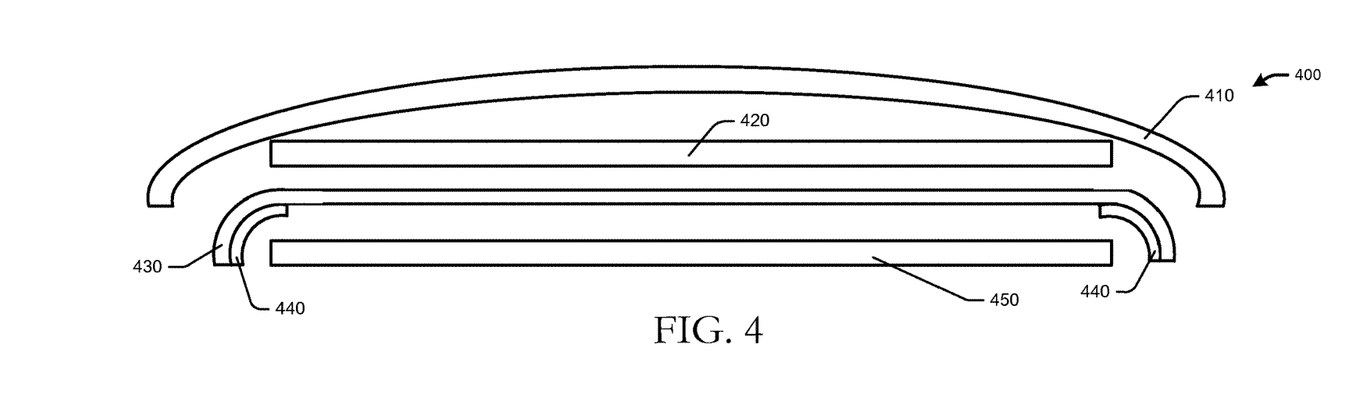
FIG. 4 is a schematic illustration of a cross-sectional view of the electronic device of FIG. 2 in accordance with one or more embodiments of the disclosure.

Referring to FIG. 4, another example embodiment of a display stack 400 with a cover 410 is depicted in accordance with one or more embodiments of the disclosure. The cover 410 may be an anti-glare coating or layer and/or cover glass. The display stack 400 includes a protective sheet 420, a front plane laminate 430, an electrode 440, and a TFT array substrate 450. The cover 410 is positioned about the protective sheet 420 of the display stack 400. The cover 410 may be planar or curved, as shown in FIG. 4. The cover 410 may be a cover layer that forms an outermost layer of an electronic device and/or protects the display stack 400. A user may interact with the cover 410 in making selections or user inputs at a device that includes the display stack 400. In one example, the cover 410 may be a cover film. The cover 410 may be flexible or rigid. The cover 410 may be formed from plastic, glass, or another suitable material. The cover 410 may be optically clear. In some embodiments, the cover 410 may include an anti-glare coating or other surface modifications. The cover 410 may be coupled to the front plane laminate 430 in some embodiments.

The front plane laminate 430 may be an electrophoretic layer or ink film layer. The front plane laminate 430 may be optically coupled to the TFT array substrate 450. In some embodiments, the front plane laminate 430 may be compliant. The front plane laminate 430 may be laminated to the TFT array substrate 450. Specifically, the front plane laminate 430 may include a first surface in contact with the TFT array substrate 450. The first surface may include a central portion surrounded by a perimeter having a first edge, a second edge, a third edge, and a fourth edge that is adjacent to a driver circuit. The central portion may have second dimensions equal to the first dimensions of the active area. The front plane laminate 430 may be die cut to a desired size and may be the same size or larger than the TFT layer size and/or the electrode size.

Figure 5:
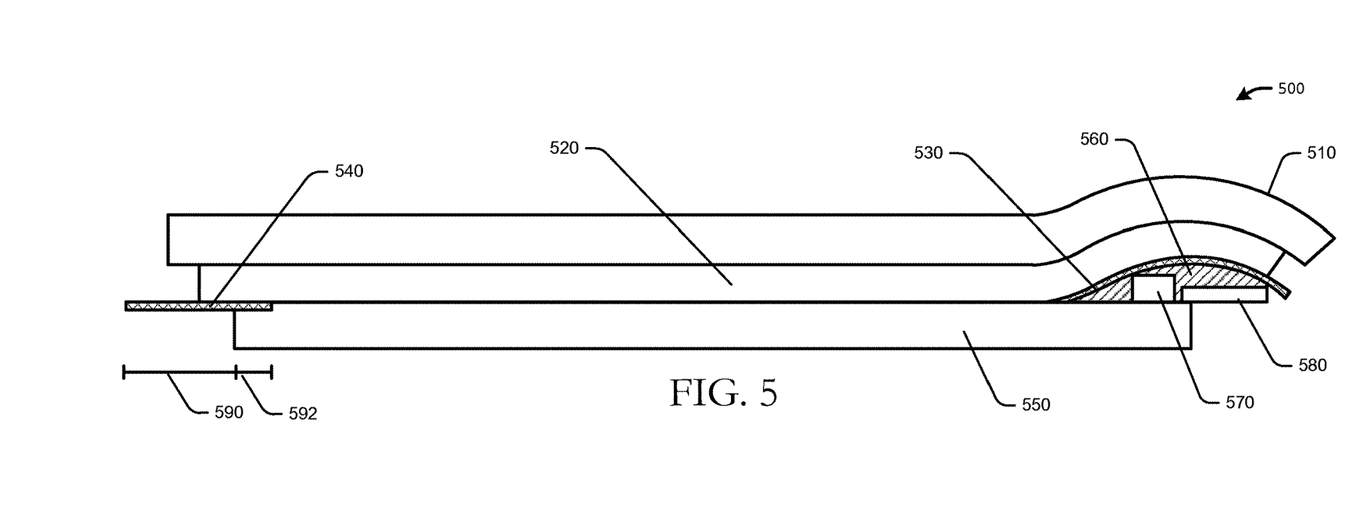
FIG. 5 is a schematic illustration of a cross-sectional view of the display stack of FIG. 2 in accordance with one or more embodiments of the disclosure.

Referring to FIG. 5, a display stack 500 is illustrated in cross-sectional view in accordance with one or more embodiments of the disclosure. The display stack 500 includes a protective sheet 510 laminated to a front plane laminate 520. A first electrode 530 and a second electrode 540 may be positioned in between the front plane laminate 520 and a TFT array substrate 550. The first electrode 530 may be in communication with, or independent of, the second electrode 540. The second electrode 540 may overhang an edge of the TFT array substrate 550 by a length 590. The second electrode 540 may therefore extend a display area of the display stack 500 by the length 590. The second electrode 540 may also overlap the TFT array substrate 550 by a length 592. For example, the second electrode 540 may overlap the TFT array substrate 550 such that the second electrode 540 is in electrical communication with the first active pixel along a periphery of the TFT array substrate 550.

The display stack 500 may include one or more circuits mounted on the TFT array substrate 550. For example, a first circuit 570 may be a driver integrated circuit and a second circuit 580 may be a flexible printed circuit. The flexible printed circuit may overhang the TFT array substrate 550. The driver circuit 570 may be coupled to the TFT layer 550 and may be configured to send signals to the TFT layer 550 to drive pixels of the TFT layer 550. The flex circuit 580 may be coupled to the TFT layer 550 adjacent to the driver circuit 570. The first electrode 530 may cover the driver circuit 570 and the flex circuit 580. The driver circuit 570 may be disposed atop a front surface of the TFT array substrate 550, and may be electrically coupled to the TFT array substrate 550 for driving the electrodes and circuitry associated therewith.

The display stack 500 may include an insulating component 560 positioned over the first circuit 570 and/or the second circuit 580. The insulating layer or component 560 may cover the driver circuit 570 and the flex circuit 580. The first electrode 530 may be laminated or adhered to the insulating component 560. The insulating component 560 may be formed of a resin material and may have a planarized or curved outer surface, and the first electrode 530 may be curved over the curved outer surface of the insulating component 560. One or both of the first electrode 530 and the second electrode 540 may be electrically coupled to the driver circuit 570 and may configured to drive the electrophoretic display stack 500 over the insulating layer 560. In some embodiments, the first electrode 530 may be electrically coupled to a border surrounding the active area and the second electrode 540 may be electrically coupled to the driver circuit 570, such that the first electrode 530 and the second electrode 540 can be driven independent of each other.

The first electrode 530 may be disposed on the insulating component 560 such that the first electrode 530 is ultimately disposed between the insulating component 560 and the front plane laminate 520. In this manner, the first electrode 530 is configured to drive the display (e.g., drive the display to white, black, a shade of grey, or another suitable color) at the portion of the display where the driver circuit 570 resides (e.g., a periphery of the display). In this manner, the driver circuit 570 can remain on the front surface of the TFT array substrate 550.

The insulating component 560 may have a thickness that tapers to a smaller and smaller thickness along a direction toward the interior region of the display until the insulating component 560 terminates on the TFT array substrate 550. In this manner, the insulating component 560 may be "wedge-shaped" to cover the driver circuit 570 but to not extend beyond an area proximate to the driver circuit 570. The insulating component 560 may have a thickness of less than or equal to about 250 microns, about 220 microns, about 210 microns, or the like. In some embodiments, the insulating component 560 may be planarized or may include a planarization layer disposed thereon to planarize the optical assembly due to the tapered thickness of the insulating component 560. In some embodiments, the insulating component 560 may include an insulating material that is deposited atop the driver circuit 570 during a manufacturing process. Any suitable insulating material may be used for the insulating component 560, including, without limitation, silicon dioxide, silicon nitride, or any other insulating material that ensures that electrical components technique for depositing the insulating component 560 may be utilized, including techniques such as a sputtering, chemical vapor deposition (CVD), physical vapor deposition (PVD), and the like. In some embodiments, the insulating component 560 may be smoothed or planarized on its front/top surface after it has been deposited on the driver circuit 570.

Some embodiments of the display stack 500 may include a transparent conductive layer disposed on the electrophoretic layer or front plane laminate 520. The transparent conductive layer may allow for an electric field to be generated upon driving the electrode of the TFT array substrate 550 with a driving voltage. The transparent conductive layer may be patterned into columns or rows for a passive matrix display, or the transparent conductive layer may be a uniform plate conductor without a pattern for an active matrix display. The transparent conductive layer may include any suitable type of electrode, including, without limitation, ITO, carbon nanotubes, silver or copper nanowires, a metal mesh screen, and the like. Moreover, the "transparent" nature of the conductive layer may allow the transparent conductive layer to be invisible to the naked eye.

An edge seal may be deposited in between the conductive layer and the transparent protective substrate. The edge seal may be comprised of any suitable resin material (e.g., Phenoxy Resin) that acts as a sealant against environmental contaminants. The edge seal may prevent oxygen and water vapor from damaging the electrophoretic material in the electrophoretic layer.

Figure 6:
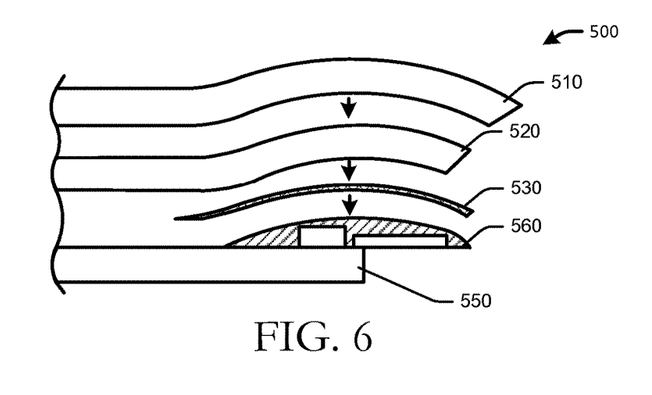
FIG. 6 is a schematic illustration of a partial detailed view of the display stack of FIG. 2 in accordance with one or more embodiments of the disclosure.
Figure 7:
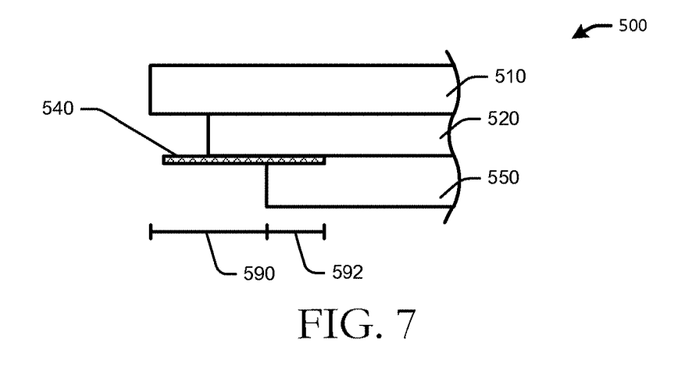
FIG. 7 is a schematic illustration of a partial detailed view of the display stack of FIG. 2 in accordance with one or more embodiments of the disclosure.

Referring to FIGS. 6 and 7, end portions of the display stack 500 are illustrated in detail. In FIG. 6, the protective sheet 510 may be adhered to, for example via an adhesive, or laminated to the front plane laminate 520. The second electrode 530 may be laminated to an opposite surface of the front plane laminate 520. The second electrode 530 may be laminated to or adhered to the insulating component 560, which may protect or insulate the first circuit 570 and the second circuit 580. The driver circuit 570 may be electrically coupled to the pixel electrode of the TFT array substrate 550 and may provide the drive signals to the pixel electrode that generates the electric field for influencing the electrophoretic particles in the display to form an image thereon. In FIG. 7, the second electrode 540 may be positioned in between the front plane laminate 520 and the TFT array substrate 550.

The TFT array substrate 550 may be driven electrically, creating a voltage potential difference which drives the ink capsules in the front plane laminate 520. The first electrode 530 and/or the second electrode 540 may be electrically coupled to at least one of the active area of the TFT array substrate 550, a border surrounding the active area, the driver circuit 570, or the flex circuit 580, and may be configured to drive the display.

Figure 8:
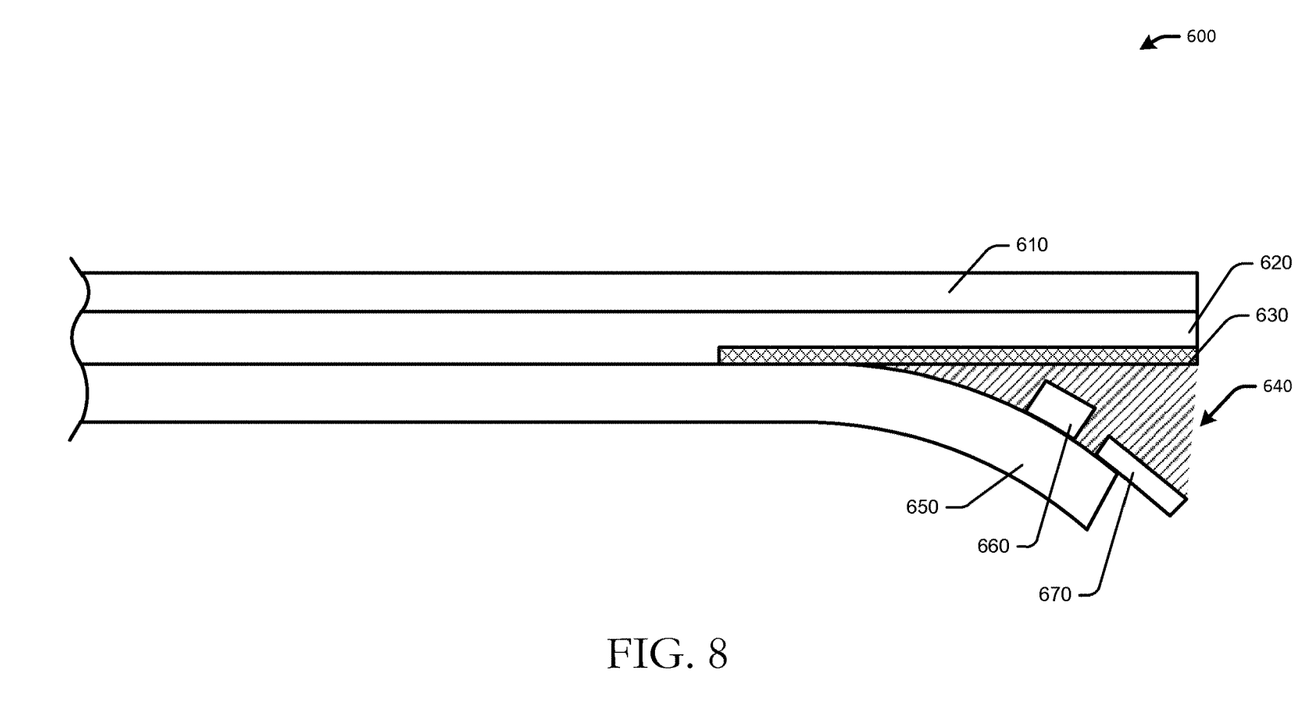
FIG. 8 is a schematic illustration of a partial detailed view of a display stack in accordance with one or more embodiments of the disclosure.

Referring to FIG. 8, another example of a display stack 600 is illustrated in accordance with one or more embodiments of the disclosure. The display stack 600 may include a protective sheet 610 coupled to a front plane laminate 620, and an electrode 630 laminated to the front plane laminate 620. The display stack 600 may include a flexible TFT layer 650 with a first circuit 660 and a second circuit 670 mounted on a surface of the TFT layer 650. The TFT layer 650 may be made of any suitable flexible material, such as, without limitation, polyamide (PA), polyimide (PI), polyethylene terephthalate (PET), polyethersulfone (PES), polycarbonate (PC), and the like. In this manner, the TFT layer 650, being flexible, may be curved instead of the electrode and/or front plane laminate. Because the TFT layer 650 is flexible, the TFT layer 650 may be bent or forced to flex while an insulating layer 640 is positioned in between, or filled in between, the electrode 630 and the TFT layer 650. For example, the TFT layer 650 may be bent down at a predetermined angle. A straight surface may be used as a dam surface while resin is inserted or filled in the space between the bent TFT layer 650 and the straight dam surface, thereby creating a straight insulating surface in the circuit 660, 670, while the TFT layer 650 is bent. The front plane laminate 620 may be laminated over the insulating resin layer 640 to create a borderless display. The insulating layer 640 may be prefabricated or may be molded directly on the TFT layer 650. For example, the insulating layer 640 may be formed by placing a mold over the desired region, inserting desired insulating resin through inlet holes in the mold, and allow the resin to dry and cure over the circuits.

Figure 9:
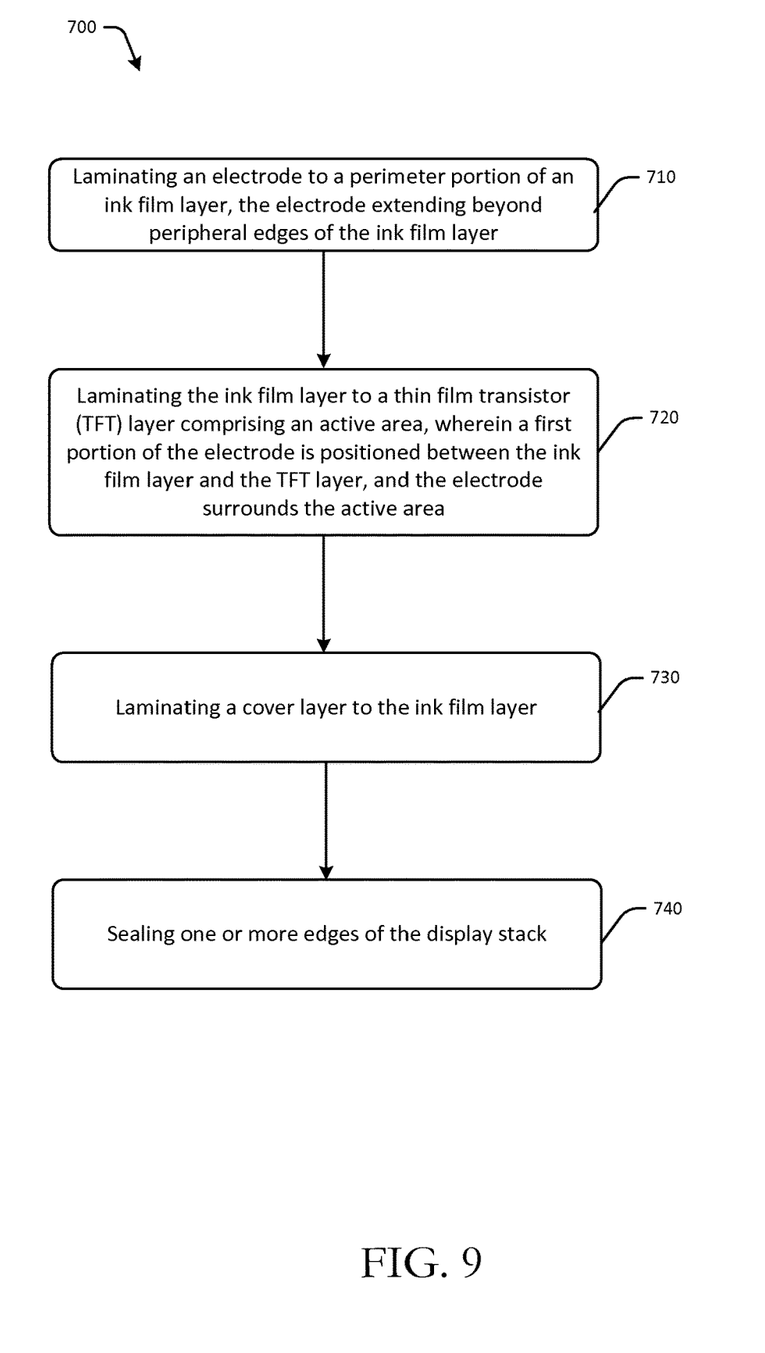
FIG. 9 is an example process flow for manufacturing a display stack in accordance with one or more embodiments of the disclosure.

FIG. 9 illustrates a flow diagram of a process 700 of manufacturing a display stack as described herein. The following operations may be performed by manual, automated, or combined automated and manual operations. At a first block 710, the process 700 includes laminating an electrode to a perimeter portion of an ink film layer, the electrode extending beyond peripheral edges of the ink film layer. Block 720 includes laminating the ink film layer to a thin film transistor layer comprising an active area, wherein a first portion of the electrode is positioned between the ink film layer and the TFT layer, and the electrode surrounds the active area. Block 730 includes laminating a cover layer to the ink film layer. Lamination may be performed using an optically clear adhesive and/or liquid adhesive to create a firm optical bond between the layers. Block 740 includes sealing one or more edges of the display stack. Moisture and/or edge sealing may prevent moisture entry. For example, an edge seal may be deposited between the conductive layer and the protective sheet where electrophoretic material in the ink layer is exposed. The edge seal may be a resign material that is applied in a viscous form and that hardens after application, such as by using a Phenoxy Resin. The edge seal may be applied to a width within a range of about 2.5 mm to 3 mm. The edge seal may prevent the ingress of environmental contaminants, such as oxygen and water vapor, to the electrophoretic material in the electrophoretic layer 180.

Certain embodiments may further include electrically coupling the electrode to the TFT layer and laminating the ink layer to the TFT layer. The ink layer may be aligned such that the electrode is electrically connected to the current border signal. In some embodiments, the laminated electrode may have extra length in desired locations to establish a connection to the driver integrated circuits. Since the electrode is conductive, it will all be driven to the same voltage level when connected to the driver integrated circuits. On one or more sides, the ink layer and electrode may be at the edge of the TFT layer or may overhang it, allowing the ink layer to bend around it or in any desired shape.

It should be noted, that the process 700 may be modified in various ways in accordance with certain embodiments of the disclosure. For example, one or more operations of process 700 may be eliminated or executed out of the illustrated order in other embodiments of the disclosure. Additionally, other operations may be added to process 700 in accordance with other embodiments of the disclosure. Certain operations may be performed simultaneously or at least partially simultaneously.

Illustrative Device Architecture

Figure 10:
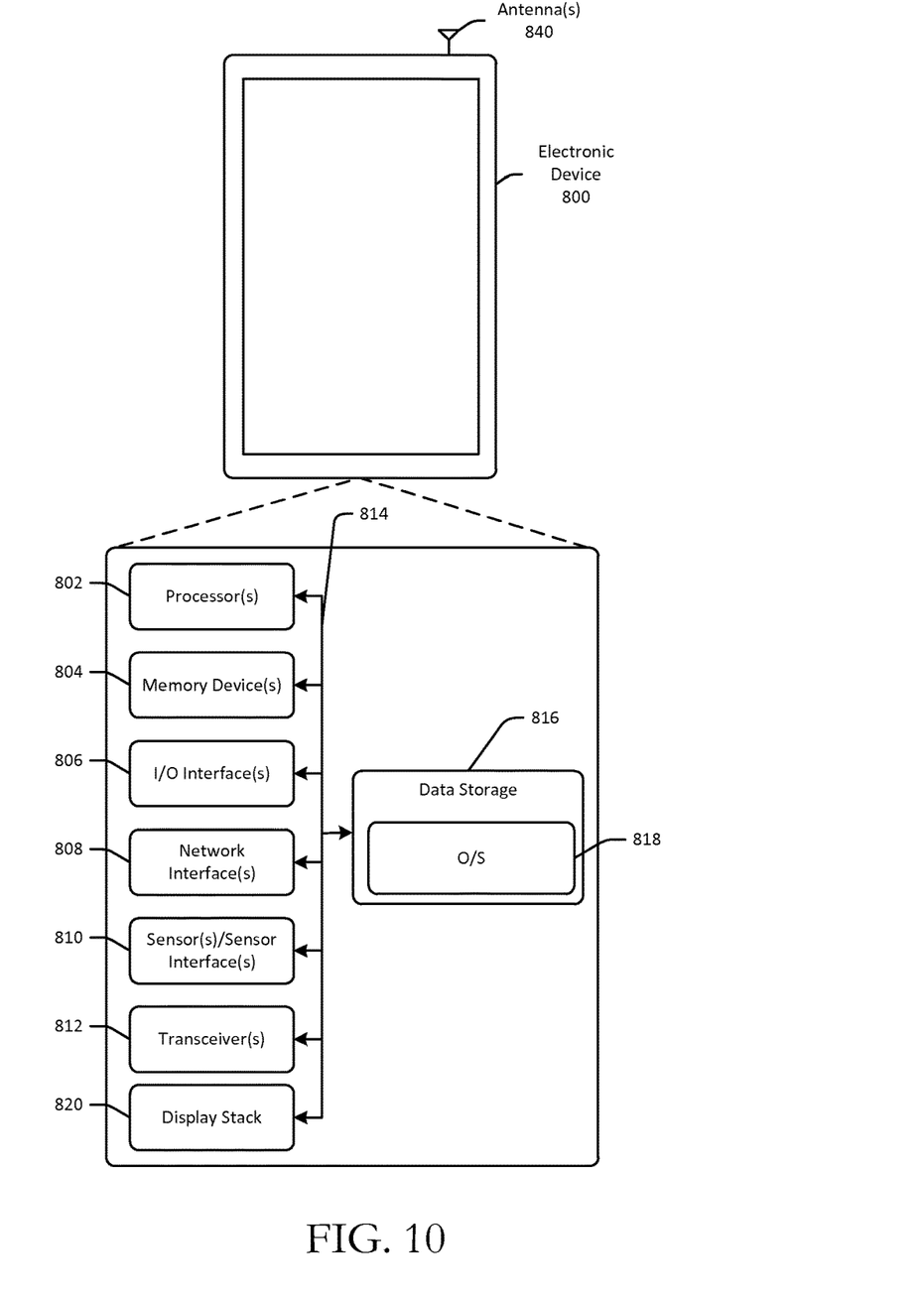
FIG. 10 is a schematic illustration of an example mobile device with a display stack in accordance with one or more example embodiments of the disclosure.

FIG. 10 is a schematic block diagram of an illustrative electronic device 800 in accordance with one or more example embodiments of the disclosure. The electronic device 800 may include any suitable computing device including, but not limited to, a mobile device such as a smartphone, tablet, e-reader, wearable device, or the like; a desktop computer; a laptop computer; a content streaming device; a set-top box; or the like.

The device 800 may be configured to communicate via one or more networks (not shown) with one or more servers, electronic devices, or the like. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 800 may include one or more processors (processor(s)) 802, one or more memory devices 804 (generically referred to herein as memory 804), one or more input/output ("I/O") interface(s) 806, one or more network interfaces 808, one or more sensors or sensor interfaces 810, one or more transceivers 812, one or more display stacks 820, and data storage 816. The device 800 may further include one or more buses 814 that functionally couple various components of the device 800. The device 800 may further include one or more antennas 840 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 814 may include at least one of a system bus, a memory bus, an address bus, or a message bus, and may permit exchange of information (e.g., data (including computer-executable code), signaling, etc.) between various components of the device 800. The bus(es) 814 may include, without limitation, a memory bus or a memory controller, a peripheral bus, an accelerated graphics port, and so forth. The bus(es) 814 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the device 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 816 may include removable storage and/or non-removable storage including, but not limited to, magnetic storage, optical disk storage, and/or tape storage. The data storage 816 may provide non-volatile storage of computer-executable instructions and other data. The memory 804 and the data storage 816, removable and/or non-removable, are examples of computer-readable storage media (CRSM) as that term is used herein.

The data storage 816 may store computer-executable code, instructions, or the like that may be loadable into the memory 804 and executable by the processor(s) 802 to cause the processor(s) 802 to perform or initiate various operations. The data storage 816 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 816 for non-volatile storage.

More specifically, the data storage 816 may store one or more operating systems (O/S) 818; one or more database management systems (DBMS); and one or more program modules, applications, or the like. Any of the program modules may include one or more sub-modules and may include computer-executable code, instructions, or the like that may be loaded into the memory 804 for execution by one or more of the processor(s) 802. Further, any data stored in the data storage 816 may be loaded into the memory 804 for use by the processor(s) 802 in executing computer-executable code. In addition, any data potentially stored in one or more datastores may be accessed via the DBMS and loaded in the memory 804 for use by the processor(s) 802 in executing computer-executable code.

The processor(s) 802 may be configured to access the memory 804 and execute computer-executable instructions loaded therein. For example, the processor(s) 802 may be configured to execute computer-executable instructions of the various program modules of the electronic device 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

The display stack 820 may comprise any component as described herein, such as a cover layer, a front plane laminate, an electrode, a TFT substrate, liquid or tape optically clear adhesives, amongst other components. The display stack 820 as described herein may be configured to provide a borderless display for the electronic device 800.

Referring now to other illustrative components depicted as being stored in the data storage 816, the O/S 818 may be loaded from the data storage 816 into the memory 804 and may provide an interface between other application software executing on the device 800 and hardware resources of the device 800. More specifically, the O/S 818 may include a set of computer-executable instructions for managing hardware resources of the device 800 and for providing common services to other application programs (e.g., managing memory allocation among various application programs). In certain example embodiments, the O/S 818 may control execution of the other program modules to dynamically enhance characters for content rendering. The O/S 818 may include any operating system now known or which may be developed in the future including, but not limited to, any server operating system, any mainframe operating system, or any other proprietary or non-proprietary operating system.

Referring now to other illustrative components of the device 800, one or more input/output (I/O) interfaces 806 may be provided that may facilitate the receipt of input information by the device 800 from one or more I/O devices as well as the output of information from the device 800 to the one or more I/O devices. The I/O devices may include, for example, one or more user interface devices that facilitate interaction between a user and the device 800 including, but not limited to, a display, a keypad, a pointing device, a control panel, a touch screen display, a gesture capture or detection device, a remote control device, a microphone, a speaker, and so forth. The I/O devices may further include, for example, any number of peripheral devices such as data storage devices, printing devices, and so forth.

The device 800 may further include one or more network interfaces 808 via which the device 800 may communicate with any of a variety of other systems, platforms, networks, devices, and so forth. Such communication may occur via any of the types of networks previously described.

The antenna(s) 840 may include any suitable type of antenna depending, for example, on the communications protocols used to transmit or receive signals via the antenna(s) 840. Non-limiting examples of suitable antennas may include directional antennas, non-directional antennas, dipole antennas, folded dipole antennas, patch antennas, multiple-input multiple-output (MIMO) antennas, or the like. The antenna(s) 840 may be communicatively coupled to one or more transceivers 812 or radio components to which or from which signals may be transmitted or received.

As previously described, the antenna(s) 840 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 840 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 100 GHZ channels (e.g. 802.11ad). In alternative example embodiments, the antenna(s) 840 may be configured to transmit or receive radio frequency signals within any suitable frequency range forming part of the unlicensed portion of the radio spectrum.

The antenna(s) 840 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 840—transmitting or receiving radio frequency (RF) signals in the bandwidth and/or channels corresponding to the communications protocols utilized by the device 800 to communicate with other devices. The transceiver(s) 812 may include hardware, software, and/or firmware for modulating, transmitting, or receiving—potentially in cooperation with any of antenna(s) 840—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the device 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, motion sensors, thermal sensors, cameras, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 10 as being stored in the data storage are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 800, and/or hosted on other computing device(s) accessible via one or more networks, may be provided to support functionality provided by the program modules, applications, or computer-executable code depicted in FIG. 10 and/or additional or alternate functionality. Further, functionality may be modularized differently such that processing described as being supported collectively by the collection of program modules depicted in FIG. 10 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 10 may be implemented, at least partially, in hardware and/or firmware across any number of devices.

It should further be appreciated that the device 800 may include alternate and/or additional hardware, software, or firmware components beyond those described or depicted without departing from the scope of the disclosure. More particularly, it should be appreciated that software, firmware, or hardware components depicted as forming part of the device 800 are merely illustrative and that some components may not be present or additional components may be provided in various embodiments. While various illustrative program modules have been depicted and described as software modules stored in data storage 816, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A display stack comprising:
a thin film transistor (TFT) backplane comprising an active area defined by one or more thin film transistors;
an electrophoretic layer coupled to the TFT backplane;
an electrode coupled to a perimeter portion of the electrophoretic layer, the electrode extending beyond one or more outer edges of the electrophoretic layer, wherein a portion of the electrode is positioned between the electrophoretic layer and the TFT backplane, and the electrode surrounds the active area, wherein the electrode is discrete from the TFT backplane; and
a cover layer coupled to the electrophoretic layer.

2. The display stack of claim 1, wherein the TFT backplane further comprises a border portion surrounding the active area, the border portion having a first width; and
wherein the electrode is in contact with the border portion and has a second width equal to or greater than the first width.

3. The display stack of claim 1, wherein the electrode comprises a first side with a first width, a second side with a second width, a third side with a third width, and a fourth side with a fourth width, wherein the fourth width is greater than the first width, the second width, and the third width.

4. The display stack of claim 3, further comprising:
a driver circuit coupled to the TFT backplane;
wherein the first side of the electrode is electrically coupled to a border surrounding the active area and the fourth side of the electrode is electrically coupled to the driver circuit, such that the first side and the fourth side are driven independent of each other.

5. The display stack of claim 3, further comprising:
a driver circuit coupled to the TFT backplane at an edge of a surface of the TFT backplane;
wherein the fourth side of the electrode is positioned along the edge of the surface of the TFT backplane and covers the driver circuit.

6. The display stack of claim 1, further comprising:
a driver circuit coupled to the TFT backplane; and
a flex circuit coupled to the TFT backplane and positioned adjacent to the driver circuit;
wherein the electrode covers the driver circuit and the flex circuit.

7. The display stack of claim 6, wherein the electrode is electrically coupled to at least one of the active area, a border surrounding the active area, the driver circuit, or the flex circuit.

8. The display stack of claim 6, wherein the flex circuit overhangs an edge of the TFT backplane; and
wherein the electrode comprises a first side with a first width, a second side with a second width, a third side with a third width, and a fourth side with a fourth width, wherein the fourth width is less than at least one of the first width, the second width, and the third width.

9. The display stack of claim 6, further comprising:
an insulating layer covering the driver circuit and the flex circuit, wherein the insulating layer comprises a resin material and a curved outer surface;
wherein the electrode is adhered to the insulating layer is curved over the curved outer surface of the insulating layer.

10. The display stack of claim 1, further comprising:
a light guide coupled to the display stack;
one or more touch layers comprising at least one touch sensor optically coupled to the light guide; and
a cover glass.

11. The display stack of claim 1, wherein the active area has a first length and a first width, and the electrode comprises a window portion having the first length and the first width.

12. A device comprising:
at least one memory that stores computer-executable instructions;
at least one processor configured to access the at least one memory and execute the computer-executable instructions; and
a display stack comprising:
a thin film transistor (TFT) backplane comprising an active area defined by one or more thin film transistors;
an electrophoretic layer coupled to the TFT backplane;
an electrode coupled to a perimeter portion of the electrophoretic layer, the electrode extending beyond one or more outer edges of the electrophoretic layer, wherein a portion of the electrode is positioned between the electrophoretic layer and the TFT backplane, and the electrode surrounds the active area, wherein the electrode is discrete from the TFT backplane; and
a cover layer coupled to the electrophoretic layer.

13. The device of claim 12, wherein the TFT backplane further comprises a border portion surrounding the active area, the border portion having a first width; and
wherein the electrode is in contact with the border portion and has a second width equal to or greater than the first width.

14. The device of claim 12, wherein the electrode comprises a first side with a first width, a second side with a second width, a third side with a third width, and a fourth side with a fourth width, wherein the fourth width is greater than the first width, the second width, and the third width.

15. The device of claim 14, wherein the display stack further comprises:
a driver circuit coupled to the TFT backplane;
wherein the first side of the electrode is electrically coupled to a border surrounding the active area and the fourth side of the electrode is electrically coupled to the driver circuit, such that the first side and the fourth side are driven independent of each other.

16. The device of claim 14, wherein the display stack further comprises:
   a driver circuit coupled to the TFT backplane at an edge of a surface of the TFT backplane;
   wherein the fourth side of the electrode is positioned along the edge of the surface of the TFT backplane and covers the driver circuit.

* * * * *